United States Patent [19]

Gallagher et al.

[11] Patent Number: 5,139,205
[45] Date of Patent: Aug. 18, 1992

[54] SEGREGATED WASTE DISPOSAL SYSTEM

[76] Inventors: Denis Gallagher, P.O. Box 944, Captain Cook, Hi. 56704; Richard A. Swetz, 28 Barker St., Apartment 1G, Mount Kisco, N.Y. 10549

[21] Appl. No.: 729,362

[22] Filed: Jul. 12, 1991

[51] Int. Cl.⁵ .................................................. B02C 4/32
[52] U.S. Cl. ........................................... 241/33; 241/79; 241/81; 241/101.2
[58] Field of Search ............... 241/33, 75, 79, 79.1, 241/81, 101.2

[56] References Cited

U.S. PATENT DOCUMENTS

| | | | |
|---|---|---|---|
| 2,991,019 | 7/1961 | Sugden | 241/81 X |
| 3,353,478 | 2/1966 | Hopkins . | |
| 3,540,495 | 11/1970 | Lundgren . | |
| 3,772,984 | 11/1973 | Karls et al. . | |
| 3,831,513 | 8/1974 | Tashman . | |
| 3,841,214 | 10/1974 | Engebretsen . | |
| 3,859,908 | 1/1975 | Karls et al. . | |
| 3,859,911 | 1/1975 | Karls et al. . | |
| 3,905,289 | 9/1975 | Engebretsen . | |
| 3,908,538 | 9/1975 | Boyd . | |
| 3,938,433 | 2/1976 | Borum . | |
| 3,962,964 | 7/1976 | Engebretsen . | |
| 4,073,229 | 2/1978 | O'Rourke et al. . | |
| 4,095,521 | 6/1978 | Hauptman . | |
| 4,119,027 | 10/1978 | Elders . | |
| 4,134,556 | 1/1979 | Ehrlick et al. | 241/101.2 X |
| 4,147,100 | 4/1979 | Dykstra . | |
| 4,241,652 | 12/1980 | Smedlund . | |
| 4,463,699 | 8/1984 | Van Doorn et al. . | |
| 4,620,479 | 11/1986 | Diamond et al. . | |
| 4,738,402 | 4/1988 | Downie | 241/101.2 X |
| 4,824,034 | 4/1989 | Baker | 241/101.2 |

*Primary Examiner*—Douglas D. Watts
*Attorney, Agent, or Firm*—Birch, Stewart, Kolasch & Birch

[57] ABSTRACT

A segregated waste disposal system is disclosed which includes a plurality of separate bins for receiving paper, plastics, glass, and metal respectively. Two openings are provided within the overall unit, one of the openings receiving paper/plastics, the other opening receiving glass/metal. The respective openings perform different disposal functions with respect to the materials inserted therein, whereby the glass/metals opening compresses the glass/metals such that the compressed glass will immediately fall through a grate into a glass bin and a sweep arm sweeps compressed metal to an adjacent metals bin. The paper/plastics opening compresses the paper/plastic and subsequently shreds the compressed material. Deflection to a respective paper/plastics bin is determined by an operators instruction achieved via a selection panel provided in connection with the waste disposal system.

9 Claims, 5 Drawing Sheets

SEGREGATED WASTE DISPOSAL SYSTEM

BACKGROUND OF THE INVENTION

1. Field of the Invention

The present invention is directed to a segregated waste disposal system, and more particularly to a segregated waste disposal system for separating and storing recyclable waste in a plurality of respective storage containers.

2. Description of Related Art

In recent years, there has been a widespread trend toward cleaning up of the environment. At an initial level this trend has begun with the residential and office movement of recycling. In some areas, recycling is a voluntary project, while other areas require recycling as a prerequisite to curb side trash removal. Many people perceive recycling to be a nuisance, since the separation of items of trash into a plurality of respective storage containers can be an inconvenience. The previous need for only one trash receptacle for all types of waste as compared to several receptacles, depending upon the number and type of separate items, can present a severe storage and space problem for most people, thereby influencing and reducing their recycling participation.

Accordingly, a need in the art exists for a segregated waste disposal system which is compact in nature and efficiently segregates known recyclable materials into easily disposable compartments.

OBJECTS AND SUMMARY OF THE INVENTION

A primary object of the present invention is to provide a segregated waste disposal system.

Another object of the present invention is to provide a segregated waste disposal system which is easy to operate and compact in size.

These and other objects of the present invention are fulfilled by providing a segregated waste disposal device comprising a plurality of waste receptacles each for receiving one of a plurality of distinct waste products therein, said plurality of distinct waste products including glass, plastic, paper and metal; means for selectively sorting each of said plurality of distinct waste products; and means, responsive to said means for selectively sorting, for processing each of said plurality of distinct waste products including means for compressing paper and plastic products, means for shredding plastic and paper products, and means for selectively diverting the plastic and paper waste to one of said plurality of waste receptacles, means for compacting metal and glass products, and means for selectively diverting the metal and glass products to respective ones of said plurality of waste receptacles.

Further scope of applicability of the present invention will become apparent from the detailed description given hereinafter. However, it should be understood that the detailed description and specific examples, while indicating preferred embodiments of the invention, are given by way of illustration only since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
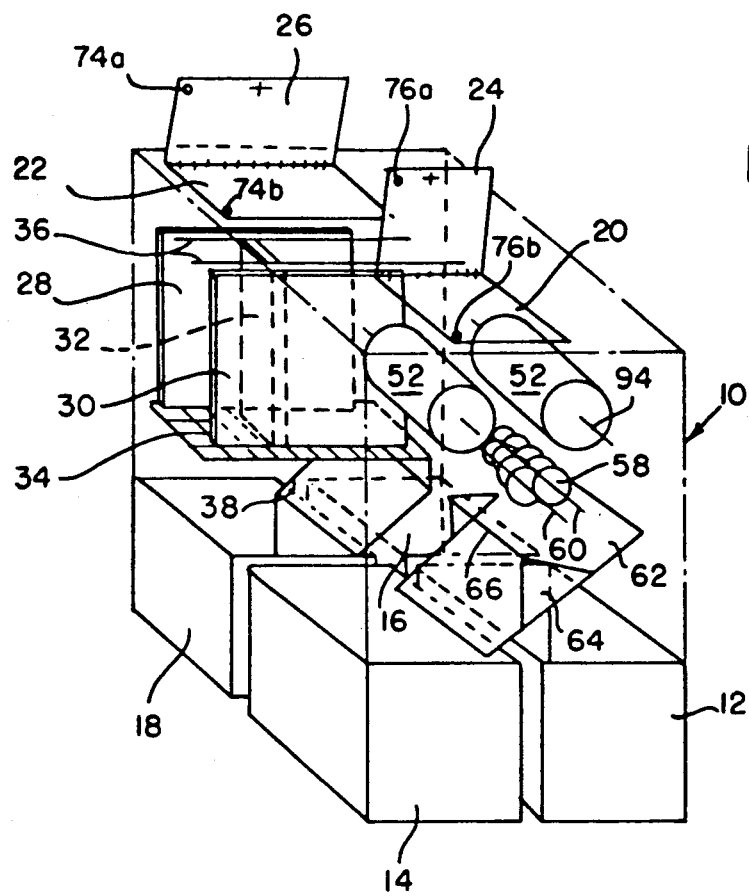
FIG. 1 is a right perspective view a segregated waste disposal system with interior components shown in phantom.

Referring in general to FIG. 1, there is shown a right perspective view of a segregated waste disposal system with interior components shown in phantom.

The waste disposal system is generally shown at numeral 10 and includes at least four bins including a paper bin 12, a plastics bin 14, a metals bin 16, and a glass bin 18. Disposal is provided via slots formed in the upper surface of the waste disposal device, these slots including a slot 20 for paper/plastic products, and a slot 22 for glass/metal products. Each of these slots is provided with lids 24, and 26 respectively. As will be more fully described hereinbelow, operation of the waste disposal system is impossible without closing the lids 24 and/or 26, respectively.

Figure 2:
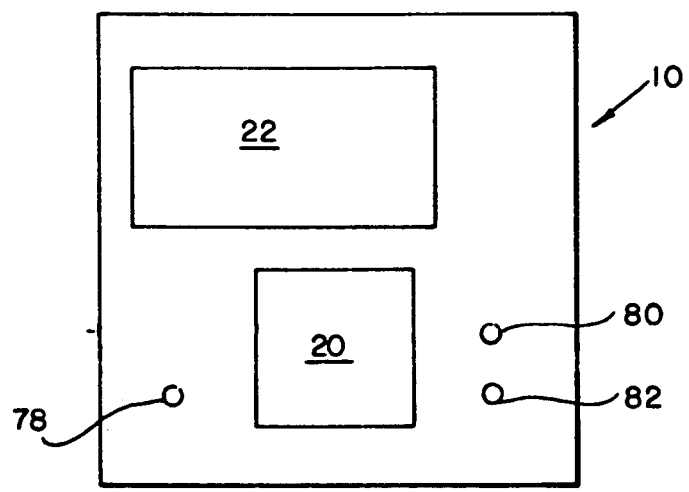
FIG. 2 is a top plan view of the waste disposal system shown in FIG. 1.

As shown in the top plan view of FIG. 2, there are at least three buttons provided for actuating the waste disposal device, these buttons being operable in connection with closing of each of the lids 24 and 26. In particular, actuator button 78 instructs the system to dispose of glass and metal waste materials, actuator button 80 instructs the system to dispose of paper waste materials, and actuator button 82 instructs the system to dispose of plastic waste materials. Each of these disposal operations will be described in further detail in FIGS. 3 through 5 and 8 in the first embodiment of the present invention and in FIGS. 6, 7, and 9 directed to a modification of the glass/metal processing in the first embodiment.

Initially, it should be understood with respect to the slot 22 in corresponding lid 26 for glass and metal waste products, that there are provided connector elements 74a on the lid 26 and connector element 74b on a corresponding interior surface against which the lid 26 rests when in a closed position in order to provide electrical contact between contacts 74a and 74b when lid 26 is closed over slot 22. Similarly, contacts 76a and 76b are provided in connection with the slot 20 for paper and plastic disposal such that once the lid 24 is in a closed position, contact and an electrical connection occurs between contacts 76a and 76b. Even upon actuation of one of the plurality of actuator buttons 78, 80, or 82, the device will not operate unless the lid is completely closed so that respective contacts are engaged. The need for this arrangement is clear in that it avoids hazardous operations of the interior components of the waste disposal system when the lids are in an up or open position.

Figure 3:
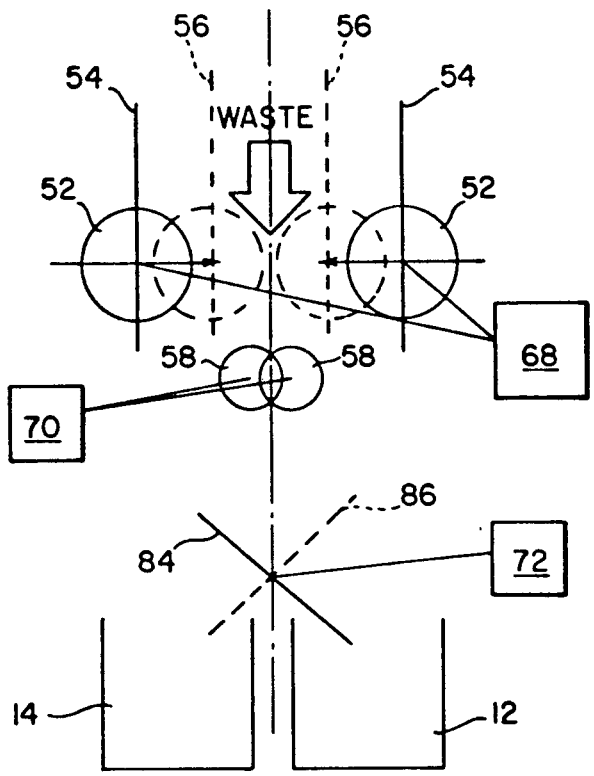
FIG. 3 is a schematic representation of a paper/plastic disposal area of the waste disposal system shown in FIG. 1.

Referring next to FIG. 3, which is a schematic representation of a paper/plastic disposal area of the waste disposal device shown in FIG. 1, the respective paper bin 12 and plastics bin 14 are shown as being positioned within the base of the waste disposal device 10. Waste is inserted into slot 20 in the upper portion of the waste disposal device 10. Subsequent to closing of the lid 24 and actuation of the paper/plastics actuator button 80 or 82, a pair of compressing wheels 52 rotatable about a central axis 94 are caused to rotate and move from a home position 54 to a compressing position 56 so as to compress either plastic or paper which is inserted into the paper/plastics slot 20.

Subsequent to compressing of the paper/plastics, a pair of rotating cutting wheels 58, rotatable about central axis 60, rotate to shred either the paper or plastic into strips for more efficient disposal thereof. Depending upon which button 80 or 82 has been actuated on the surface of the waste disposal device 10, a deflector plate 62 is pivoted about an axis 66 so that the paper or plastics waste is directed to an appropriate bin 12 or 14, respectively. If desired, an additional bin (not shown) for paper may be provided along with an associated actuator button for designating and receiving true white paper such as computer paper and the like. The deflector 72 in such an instance may either be further elongated or selectively extensible in order to direct pure white paper to an appropriate bin.

As more clearly seen in FIG. 1, the deflector plate 62 is supported by a pair of opposing triangular sections 64 which are pivotably connected to the pivot axis 66. Actuation of the deflector plate in either of the two predetermined directions is achieved through an electromechanical mechanism 72 for directing the deflector plate in a proper direction according to an actuator button selection 80 or 82 on the surface of disposal device 10.

As shown in FIG. 3, when the deflector plate 62 directs the waste toward the paper bin, the deflector plate 62 is considered to be in position 84 for deflecting paper. Similarly, when the deflector plate 62 is in a position to divert waste into plastics bin 14, the deflector plate 62 is considered to be in a position 86 for deflecting plastic. An electromechanical actuator device 68 is provided for rotating the pair of compressing wheels 52 as well as moving the compressing wheels from the home position 54 to the compressing position 56 once the paper or plastics actuator buttons 80 or 82 have been actuated. Further, an electromechanical mechanism 70 is provided for rotating the shredders 58 for shredding either the paper or plastic material. It should be understood that any suitable type of mechanical devices may be used for actuating the various elements for compressing, shredding, or positioning the deflector plate 62.

Figure 4:
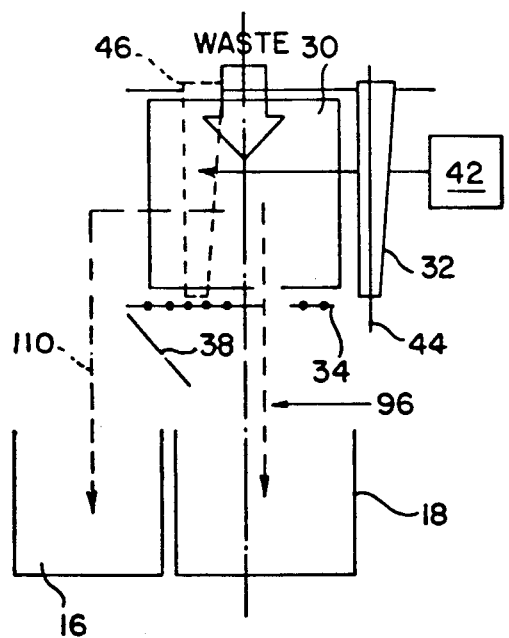
FIG. 4 is a side schematic representation of a glass/metal disposal area of the waste disposal system shown in FIG. 1.
Figure 5:
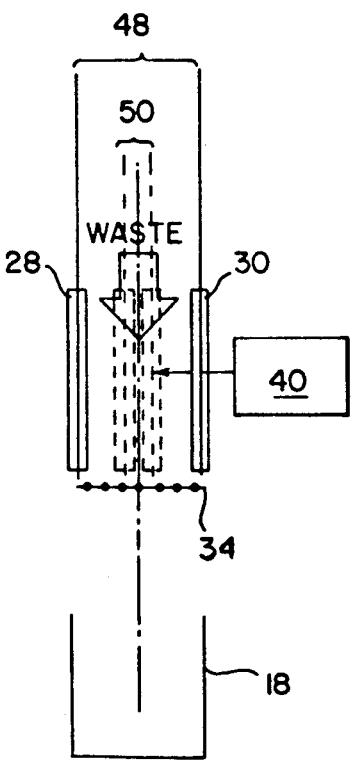
FIG. 5 is a front schematic representation of a compressing mechanism for the glass/metal disposal area shown in FIG. 4.

Referring now to FIGS. 4 and 5 there is shown a side and front schematic representation, respectively, of a glass/metal disposal area of the waste disposal system shown in FIG. 1. In particular, there is shown the metals bin 16 and the glass bin 18, the view in FIG. 5 being such that only the glass bin 18 can be seen. Upon insertion of glass or metal waste products into slot 22 and closure of the lid 26 to provide connection between connectors 74a and 74b, the glass/metals actuator button 78 may be actuated in order to initiate the disposal process. First, a pair of first and second compactor or compressing plates 28, 30, respectively, actuated by mechanism 40 compress to thoroughly flatten the waste inserted between the compressing plate 28 and compressing plate 30. If the waste disposed of is glass, the compressing plates 28 and 30 will sufficiently crumble the glass material such that the glass will simply fall through a grate 34 positioned at the base of compressing plates 28 and 30, the glass then falling directly into the glass bin 18. In order to ensure that all of the glass is properly directed into bin 18, a glass deflector plate 38 is provided at the edge of the grate member 34 and directed toward the glass bin 18. In this embodiment, a sweep arm 32, actuated by a sweep arm actuating mechanism 42 also moves from a home position 44 to a sweep arm disposal position 46 at a far end of grate 34 in order to dispose of metal products in the event that metal has been inserted simultaneously with the glass or a metal product has been inserted into the waste disposal device alone. Upon movement of the sweep arm 32 from the home position 44 to the disposal position 46, the metal will drop into metals bin 16 along path 110. This process can also be seen from the front in FIG. 5 in which the compressing plates 28 and 30 are also shown as having home positions 48 and compressing positions 50 in order to completely compress any material inserted therebetween.

Figure 8:
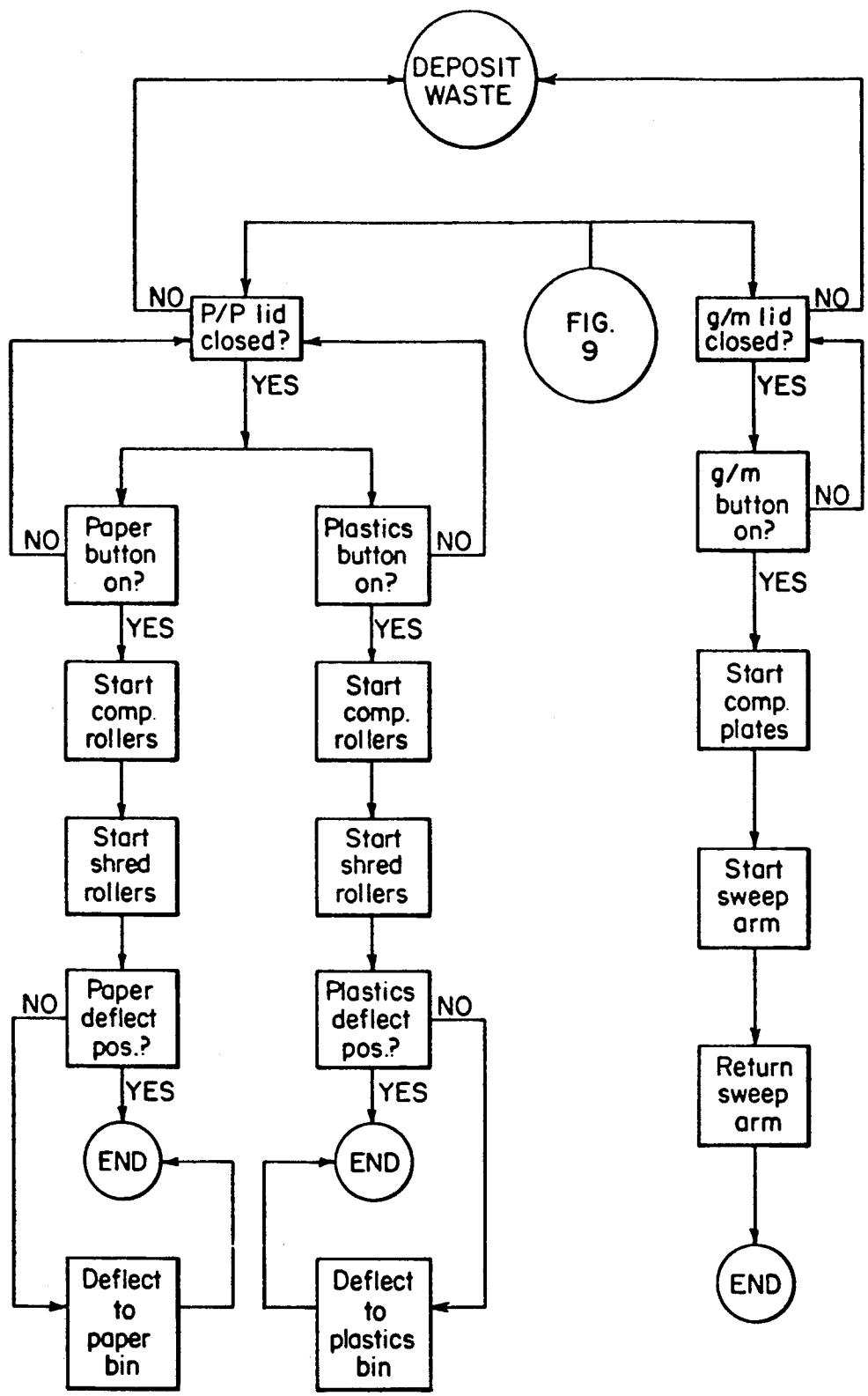
FIG. 8 is a block diagram showing an overall operation of the segregated waste disposal system of the first embodiment.

FIG. 8 is a flow chart showing an overall operation of the segregated waste disposal system just described in connection with FIGS. 1 through 5. Specifically, following along in FIG. 8 the waste is deposited as a first step in the waste disposal system, and it is detected via connectors 74a and 74b whether or not the paper/plastics lid is closed and whether or not the glass/metals lid is closed in order to proceed with a waste disposal operation. First, if the paper/plastics lid is closed, it is detected whether or not the paper button is on or the plastics button is on. If the paper button is on, the compressing rollers are actuated followed by actuation of the shredding rollers in order to compress and shred the paper material. It is detected whether or not the deflector plate 62 is directed to the paper bin or the plastic bin, and if it deflected towards the plastic bin, the deflector is diverted to be directed toward the paper bin. Once it is detected that the deflector is directed toward the paper bin, the compressed and shredded paper is deposited in the paper bin and the cycle has ended. Similarly, if the plastics button has been actuated, the compressing rollers are actuated followed by actuation of the shredding rollers. If it is detected that the deflector is directed toward the paper bin, the deflector is adjusted to be directed toward the plastics bin so that the shredded plastic material may be deposited into the proper bin. This completes the sequence of events for disposal of plastics.

If the glass/metals lid is closed and it is detected that the glass/metals button has been actuated or is in an "ON" position, the compression plates are actuated in order to compact the glass or metal material and as previously indicated, if glass is compressed, it falls directly into the glass bin, whereas the sweep arm is actuated to move to the metal disposal position in order to dispose of any compressed metal followed by a return of the sweep arm to a home position for completion of the cycle.

Figure 6:
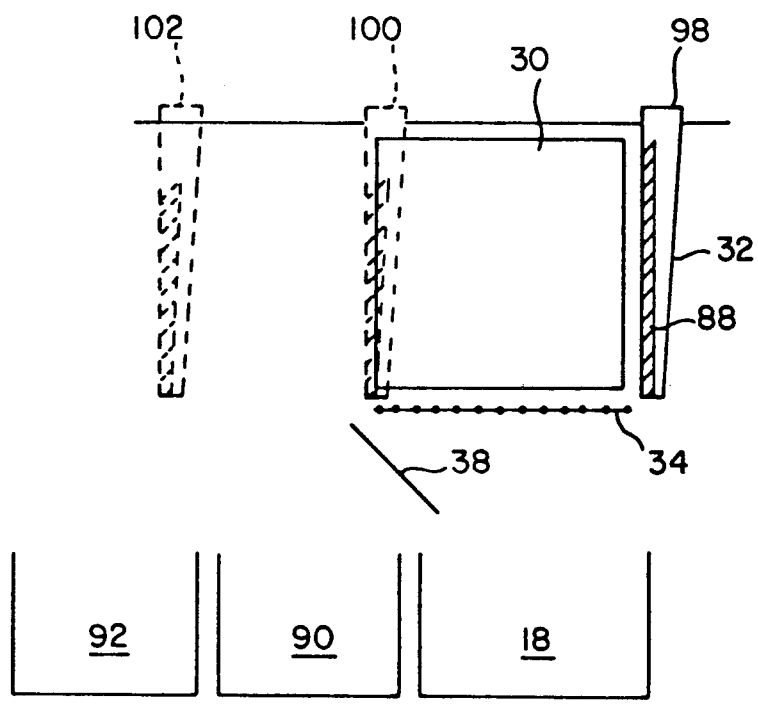
FIG. 6 is a schematic representation of an alternative embodiment of the waste disposal system shown in FIG. 1 including aluminum separation.
Figure 7:
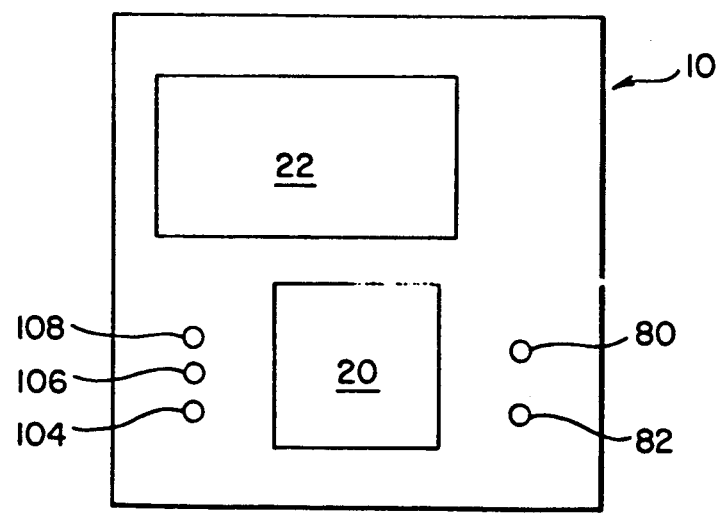
FIG. 7 is a top plan view of the waste disposal system shown in FIG. 6.

Referring now to the embodiments shown in FIGS. 6 and 7, there is shown a modification of the glass/metals section of the waste disposal device shown in FIG. 1 with the added capability of disposing of aluminum and steel/tin materials in a more specific and complete manner as opposed to classifying all metals as a single type of waste. In this regard, there is an electromagnet 88 positioned on the sweep arm 32 as shown in FIG. 6. As shown in FIG. 7, there are two additional selector buttons provided on the surface of the waste disposal system 10, including a singular glass button 104, an aluminum button 106 and a steel/tin and "UNIVERSAL" button 108. Referring again to FIG. 6, if the glass button 104 is actuated, compressor plates 28 and 30 are actuated by mechanism 40 similar to that described in connection with the first embodiment, thereby compressing the glass and dropping the same into glass bin 18 directly through grate 34 provided at the base of the compressing plates 28 and 30. In the modified embodiment, however, the sweep arm 32 is not actuated unless either of the other two selector buttons 106 or 108 is actuated. Specifically, if selector button 106 is actuated indicating that aluminum has been deposited in the metals slot 22, the sweep arm 32 is moved from a home position 98 to an aluminum drop position 100 without energizing the electromagnet so that the aluminum material will simply be dropped into aluminum bin 90 once the sweep arm reaches that location Further, if the steel/tin and "UNIVERSAL" button is selected, the electromagnet 88 is energized and the sweep arm 30 moves all the way to a steel/tin drop position 102 above the steel/tin bin 92 and upon deactivation of the electromagnet 88 the compressed steel/tin waste material is dropped directly into bin 92.

Along with the capability of disposing of the steel/tin waste, the "UNIVERSAL" indication on the same button instructs the user that any type of metal or glass may be deposited in the bin for disposal If one or several wastes including glass and/or metals is deposited, selection of the "UNIVERSAL" or steel/tin button enables the sequence to progress through depositing of glass through the grate, any aluminum in the aluminum receptacle and any steel/tin in the appropriate receptacle upon release of the electromagnet at the end of the sweeping operation. In other words, the push button which may be singularly used for steel/tin, is also the "UNIVERSAL" button which can handle any type of glass/metals waste deposited in the glass/metals slot 22. The electromagnet 88 is such that it will preferably attract steel or tin and once deactivated will drop the compressed material into the appropriate bin at a stop position as indicated.

Figure 9:
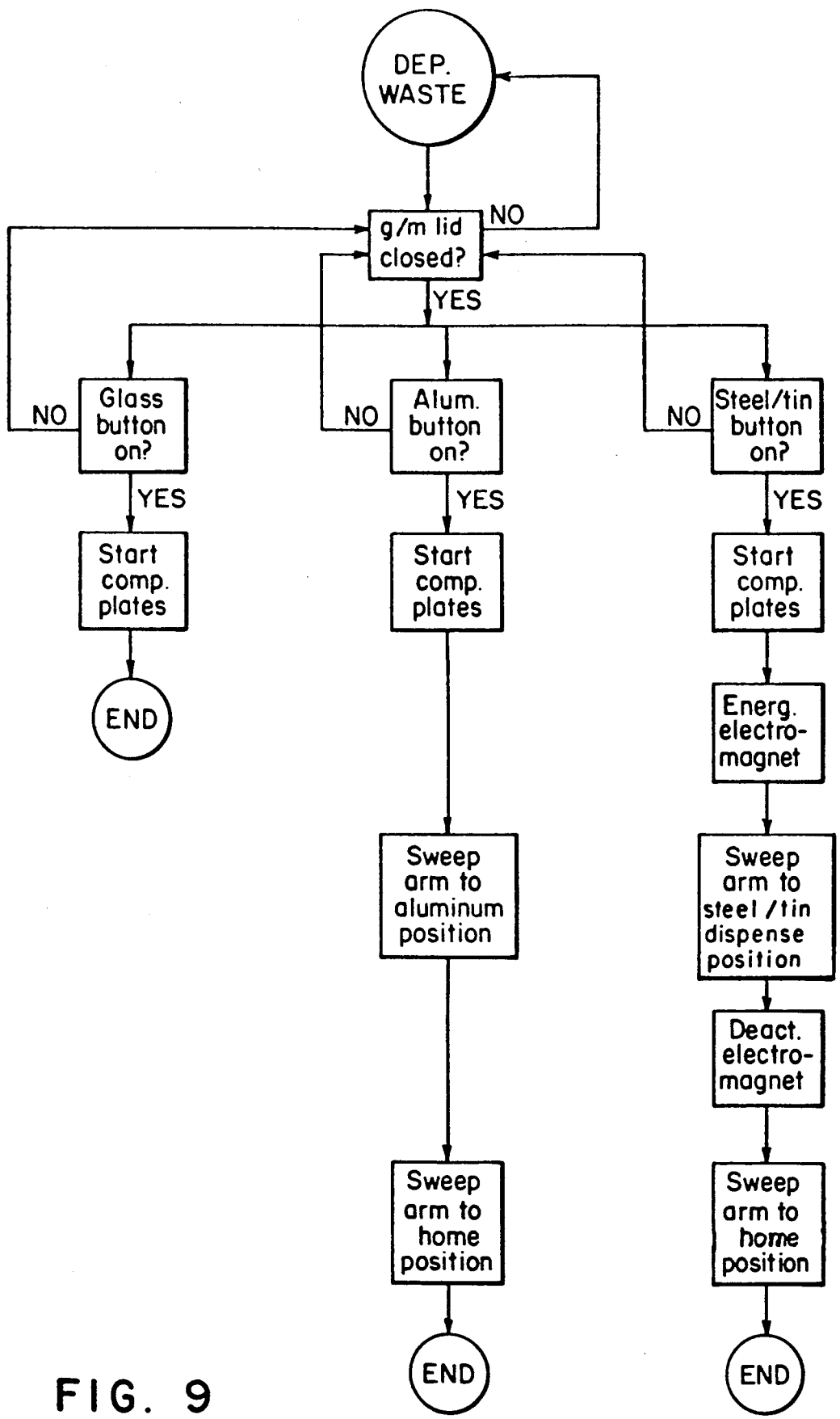
FIG. 9 is a block diagram showing operation of the modified portion of the waste disposal system of a modification of the first embodiment.

The sequence of events just described is shown in FIG. 9 whereby waste is deposited as the first step into the glass/metals bin, followed by closing of the glass/metals lid. Upon detection of a closed lid, an actuation of either the glass button, aluminum button or the "UNIVERSAL" and steel/tin button, a respective process occurs. In particular, upon actuation of the glass button, the compression plates are actuated in order to compress the glass, and the glass is directly deposited into the glass bin in a crushed state thereby ending the glass disposal sequence. If the aluminum button is selected, the compression plates are actuated and the sweep arm is moved to the aluminum dispense position in order to drop the aluminum into the appropriate aluminum bin, followed by return of the sweep arm to a home position. Similarly, if the "UNIVERSAL" and steel/tin button is actuated, the compression plates compress the steel or tin material, the electromagnet is energized and the sweep arm moves to a steel/tin dispense position, followed by deactivation of the electromagnet in order to drop the steel or tin into the appropriate bin, and the sweep arm is thereafter returned to its home position. As indicated above, this particular sequence will also dispose of glass and aluminum.

Use of the "UNIVERSAL" and steel/tin button will automatically separate the glass, aluminum and steel/tin waste without the operator pressing a button indicating a specific type of waste. Having a means to allow the operator to make a distinction, however, between the types of waste is useful because a specific selection of either glass or aluminum activates only a portion of the sweep mechanism or none at all, thereby saving energy. The "UNIVERSAL" and steel/tin button is appropriate if plural wastes are deposited, for convenience, and of course for specifically disposing of steel/tin.

It should be understood that the modification shown in FIGS. 6, 7, and 9 is a modification of the primary embodiment shown in FIG. 1 and the first embodiment may be easily implemented to include this additional feature of selectively disposing of aluminum or steel/tin materials.

Several options may be had with respect to each of the embodiments disclosed above including the ability to provide permanent, disposable or lined bins 12, 14, 16, and 18. Also in this regard, while not specifically shown for reasons of clarity, it should be understood that the bins are removable from the base of the overall system preferably by sliding the same out through the front of the device 10 in order to dispose of the contents thereof when each of the bins becomes full.

Further, each of the selector buttons may be replaced by automatic sensors which are activated when waste is inserted into a respective slot.

Further, sensors may be provided to detect if the bins are full thereby assisting the consumer in determining when and whether or not to dispose of the contents of the bins.

As seen from the figures, the unit is compact and is preferably the size of a standard dishwasher, approximately 0.6 meters (two feet) wide by 0.6 meters (two feet) deep by 0.9 meters (three feet) high.

Although each of the embodiments are shown with lids provided for each of the slots for safety reasons, the device may be modified to operate without this feature if continuous and heavy use is required in, for instance, industrial applications.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A segregated waste disposal device comprising:
    a plurality of waste receptacles each for receiving one of a plurality of distinct waste products therein, said plurality of distinct waste products including glass, plastic, paper, and metal;

means for selectively sorting each of said plurality of distinct waste products; and means, responsive to said means for selectively sorting, for processing each of said plurality of distinct waste products including:

means for compressing paper and plastic products means for shredding plastic and paper products, means for selectively diverting the plastic and paper waste to one of said plurality of waste receptacles, means for compacting metal and glass products, and means for selectively diverting the metal and glass products to one of said plurality of waste receptacles.

2. The device according to claim 1, wherein said means for selectively sorting includes first and second inlet openings and actuator means for automatically identifying one of said plurality of distinct waste products inserted into one of said first and second inlets.

3. The device according to claim 1, wherein said means for compressing paper and plastics includes a pair of rotatable, bi-directionally actuatable compressing wheels, said wheels being actuable from at least a home position to a compressing position in which plastic is compressed and paper is fed towards said means for shredding.

4. The device according to claim 1, wherein said means for selectively diverting includes a deflector plate positioned beneath said means for shredding and pivotal about a predetermined pivot point between each of a paper waste receptacle and a plastics waste receptacle, whereby compressed and shredded plastic is automatically directed to the plastics receptacle and shredded paper is automatically directed to the paper receptacle.

5. The device according to claim 1, wherein said means for compacting metal and glass products includes first and second bi-directionally actuable compressor plates positioned above a grate member, whereby compression and retraction of said plates enables compaction of metal and glass materials.

6. The device according to claim 5, wherein compacted glass material will free-fall through said grate member into a glass receiving bin.

7. The device according to claim 5, further including a sweep arm for sweepingly clearing compacted debris from a surface of said grate member for disposal into a bin other than said glass bin, said debris including compacted metals.

8. The device according to claim 7, wherein said sweep arm includes a selectively actuable electromagnet, said electromagnet, upon activation thereof, attracting metals having steel and tin in their composition and upon deactivation thereof depositing previously attracted metals into a selected bin.

9. The device according to claim 1, wherein said plurality of waste receptacles are provided as individual removable units within an independent housing.

* * * * *